US008369251B2

(12) United States Patent
Prakash et al.

(10) Patent No.: US 8,369,251 B2
(45) Date of Patent: Feb. 5, 2013

(54) TIMESTAMP QUALITY ASSESSMENT FOR ASSURING ACOUSTIC ECHO CANCELLER OPERABILITY

(75) Inventors: Vinod Prakash, Redmond, WA (US); Chao He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 990 days.

(21) Appl. No.: 12/143,625

(22) Filed: Jun. 20, 2008

(65) Prior Publication Data

US 2009/0316881 A1 Dec. 24, 2009

(51) Int. Cl.
*H04B 3/20* (2006.01)
*H04M 9/08* (2006.01)

(52) U.S. Cl. ............... 370/287; 379/406.04; 379/406.08

(58) Field of Classification Search ........................ None
See application file for complete search history.

(56) References Cited

U.S. PATENT DOCUMENTS 4,039,753 A 8/1977 Balogh et al.
4,069,395 A 1/1978 Nash
4,275,398 A 6/1981 Parker et al.
4,359,606 A 11/1982 Shoichi
4,636,586 A 1/1987 Schiff
4,696,015 A 9/1987 Palicot et al.
4,696,032 A 9/1987 Levy
5,099,472 A 3/1992 Townsend et al.
5,263,019 A 11/1993 Chu
5,305,307 A 4/1994 Chu
5,323,459 A 6/1994 Hirano
5,353,348 A 10/1994 Sendyk et al.
5,430,796 A 7/1995 Komoda et al.
5,454,041 A 9/1995 Davis
5,477,534 A 12/1995 Kusano
5,542,000 A 7/1996 Semba
5,559,793 A 9/1996 Maitra et al.
5,619,582 A 4/1997 Oltman et al.
5,646,990 A 7/1997 Li
5,666,407 A 9/1997 Pfeifer
5,680,450 A 10/1997 Dent et al.
5,721,730 A 2/1998 Genter
5,923,749 A 7/1999 Gustafsson et al.
6,002,776 A 12/1999 Bhadkamkar et al.
6,044,150 A 3/2000 Rigstad et al.
6,078,645 A * 6/2000 Cai et al. ........................... 379/3
6,081,722 A 6/2000 Duque-Antón et al.

(Continued)

FOREIGN PATENT DOCUMENTS

GB 2269968 3/1996
WO WO2007147033 A2 12/2007

OTHER PUBLICATIONS

W. J. Riley ("Techniques for Frequency Stability Analysis, IEEE International Frequency Control Symposium" and dated May 4, 2003) pp. 10, 30, and 33.*

(Continued)

*Primary Examiner* — Fan Tsang
*Assistant Examiner* — Jeffrey Lytle
(74) *Attorney, Agent, or Firm* — Klarquist Sparkman, LLP

(57) ABSTRACT

A voice communication end device provides echo reduction when operating in a full duplex mode using acoustic echo cancellation, which includes periodic audio queue adjustments to account for drift. The end device performs a quality assessment by calculating consistency statistics for the queue adjustments to determine whether acoustic echo cancellation would be ineffective, and if so falls back to a half duplex mode using voice switching.

20 Claims, 4 Drawing Sheets

U.S. PATENT DOCUMENTS 6,169,728 B1 1/2001 Perreault et al.
6,205,124 B1 3/2001 Hamdi
6,212,273 B1 * 4/2001 Hemkumar et al. ..... 379/406.08
6,215,880 B1 4/2001 Hasegawa
6,219,418 B1 4/2001 Eriksson et al.
6,324,170 B1 11/2001 McClennon et al.
6,377,679 B1 4/2002 Hashimoto et al.
6,418,203 B1 7/2002 Marcie
6,535,609 B1 3/2003 Finn et al.
6,574,336 B1 6/2003 Kirla
6,583,821 B1 * 6/2003 Durand ......................... 348/515
6,707,910 B1 3/2004 Valve et al.
6,724,736 B1 4/2004 Azriel
6,738,358 B2 5/2004 Bist et al.
6,748,086 B1 6/2004 Venkatesh et al.
6,799,062 B1 9/2004 Piket et al.
6,868,157 B1 3/2005 Okuda
7,031,269 B2 4/2006 Lee
7,085,370 B1 8/2006 Arana-Manzano et al.
7,120,259 B1 10/2006 Ballantyne et al.
7,433,463 B2 10/2008 Alves et al.
2002/0090008 A1 7/2002 Cioffi et al.
2002/0101982 A1 8/2002 Elabd
2003/0174847 A1 9/2003 Lane et al.
2003/0206624 A1 11/2003 Domer et al.
2003/0206625 A9 11/2003 Ahmad
2004/0001597 A1 1/2004 Marton
2004/0001598 A1 1/2004 Balan et al.
2004/0013275 A1 1/2004 Balan et al.
2004/0081315 A1 4/2004 Boland et al.
2004/0125942 A1 7/2004 Beaucoup et al.
2004/0141528 A1 7/2004 LeBlanc et al.
2005/0223113 A1 * 10/2005 Hoffmann ..................... 709/245
2006/0018459 A1 1/2006 McCree
2007/0019802 A1 * 1/2007 Ubriaco et al. .......... 379/406.01
2007/0041324 A1 * 2/2007 Shenoi .......................... 370/235
2007/0047738 A1 * 3/2007 Ballantyne et al. ............. 381/66
2007/0165837 A1 * 7/2007 Zhong et al. ............. 379/406.01
2007/0165838 A1 7/2007 Li et al.
2007/0263849 A1 11/2007 Stokes et al.
2007/0263850 A1 11/2007 Stokes et al.
2007/0280472 A1 12/2007 Stokes et al.
2009/0207763 A1 * 8/2009 Li et al. ......................... 370/287

OTHER PUBLICATIONS

"Techniques for Frequency Stability Analysis, IEEE International Frequency Control Symposium" and dated May 4, 2003.*

Buchner et al., "Wave-Domain Adaptive Filtering: Acoustic Echo Cancellation for Full-Duplex Systems Based on Wave-Field Synthesis," *Proceedings of the 2004 IEEE International Conference on Acoustics, Speech, and Signal Processing*, vol. 4, 2004, pp. IV-117-IV-120.

Yensen et al., "Echo Target Determination Using Acoustic Round Trip Delay for Voice Over IP Conferences," *Proceedings of the 1999 IEEE International Symposium on Circuits and Systems*, vol. 4, 1999, pp. IV-348-IV-351.

CISCO, "Configuring Echo Cancellation," http://www.cisco.com/en/US/docs/ios/12_3/vvf_c/voice_port_configuration_guide/ch5_echo.html, © 1992-2008, 17 pages.

Ahgren, "Teleconferencing, System Identification and Array Processing," IT Licentiate Thesis, Uppsala University Department of Information Technology, <http://www.it.uu.se/research/publications/lic/2001-012/2001-012.pdf>, 75 pages, Oct. 2001.

Ditech Communications, "Ditech's Voice Quality Assurance™," <http://www.ditechcom.com/platforms/DataSheets/OV_VQA.pdf>, 2 pages, 2005.

"Echo Cancellation," Chapter 4, pp. 1-8 (1990).

Frunze, "Echo Cancellation Demystified," Technical Paper, SPIRIT Corp., undated, 13 pages.

Herbordt et al., "Joint Optimization of Lcmv Beamforming and Acoustic Echo Cancellation," <http://www.slt.atr.jp/~wherbord/archives/mypub/HerbordtJoint_optimization_of_LCMV_beamforming_and_acoustic_echo_cancellation.pdf>, 4 pages.

Hoshuyama, "Nonlinear Echo Suppression Technology Enabling Quality Handsfree Talk for Compact Equipment," NEC Technical Journal, vol. 2, No. 2, 2007, pp. 27-30.

Knowles Acoustics, "Beat the Noise and Echo, Communicate Anywhere via VoIP," <http://www.speechtechmag.com/whitepapers/knowlesa.pdf, 11 pages, 2004.

* cited by examiner 100
110
120
130
170
Near End User
voice(t)
mic(t)
A/D
Capture Buffer
mic[n]
Voice Encoder
voice[n]
To the other end
echo(t)
spk(t)
D/A
Render Buffer
spk[n]
Voice Decoder
From the other end
160
150
140
180

Near End User
100
voice(t)
210
mic(t)
A/D
Capture Buffer
mic[n]
AEC
Voice Encoder
voice[n]
To the other end
echo(t)
spk(t)
D/A
Render Buffer
spk[n]
Voice Decoder
From the other end 210
310
mic[n]
Adaptive Filter
residual[n]=voice[n]
spk[n]

530
TIMESTAMP QUALITY EVALUATION
610
MIN QUEUE ADJUSTEMENTS?
NO
YES
620
ESTIMATE DRIFT RATE
630
CALCULATE MEDIAN AND MEDIAN ABSOLUTE DEVIATION OF DRIFT RATE
640
EXCEEDS CONSISTENCY THRESHOLD?
YES
NO
650
GLITCH FREQUENCY CHECK?
FAIL
OK
660
QUALITY=POOR
670
QUALITY=GOOD

TIMESTAMP QUALITY ASSESSMENT FOR ASSURING ACOUSTIC ECHO CANCELLER OPERABILITY

BACKGROUND

Acoustic echo is a common phenomenon occurring in two-way voice communication when open speakers are used. For example, FIG. 1 illustrates one end 100 of a typical two-way communication system. The other end is exactly the same. In such a system, the far-end voice is played through a loud speaker 160 and captured by the microphone 110 in the system and sent back to the far end. The far-end user then hears his or her own voice with a certain delay.

There are a number of known approaches to reducing acoustic echo in two-way communication systems. However, these known approaches face particular problems when applied to voice communication systems using personal computers, such as internet telephony and voice chat applications on personal computers.

1. Acoustic Echo Cancellation

Acoustic Echo Cancellation (AEC) is a digital signal processing technology which is used to remove the acoustic echo from a speaker phone in two-way (full duplex) or multi-way communication systems, such as traditional telephone or modern internet audio conversation applications.

With reference again to the example near end 100 of a typical two-way communication system illustrated in FIG. 1, an Acoustic Echo Cancellation is used to remove echo of the far end user's voice. The example near end 100 includes a capture stream path and a render stream path for the audio data in the two directions. The far end of the two-way communication system is exactly the same. In the capture stream path in the figure, an analog to digital (A/D) converter 120 converts the analog sound mic(t) captured by microphone 110 to digital audio samples continuously at a sampling rate ($fs_{mic}$). The digital audio samples are saved in capture buffer 130 sample by sample. The samples are retrieved from the capture buffer in frame increments (herein denoted as "mic[n]"). Frame here means a number (N) of digital audio samples. The index 'n' is used to indicate relative sampling instants for the frames. Finally, samples in mic[n] are processed, including encoding via a voice encoder 170 and sent to the other end.

In the render stream path, the system receives the encoded voice signal from the other end, decodes audio samples via voice decoder 180 and places the audio samples into a render buffer 140 in periodic frame increments (labeled "spk[n]" in the figure). Then the digital to analog (D/A) converter 150 reads audio samples from the render buffer sample by sample and converts them to an analog signal continuously at a sampling rate, $fs_{spk}$. Finally, the analog signal is played by speaker 160.

In systems such as that depicted by FIG. 1, the near end user's voice is captured by the microphone 110 and sent to the other end. At the same time, the far end user's voice is transmitted through the network to the near end, and played through the speaker 160 or headphone. In this way, both users can hear each other and two-way communication is established. But, a problem occurs if a speaker is used instead of a headphone to play the other end's voice. For example, if the near end user uses a speaker as shown in FIG. 1, his microphone captures not only his voice but also an echo of the sound played from the speaker (labeled as "echo(t)"). In this case, the mic[n] signal that is sent to the far end user includes an echo of the far end user's voice. As the result, the far end user would hear a delayed echo of his or her voice, which is likely to cause annoyance and provide a poor user experience to that user.

Practically, the echo echo(t) can be represented by speaker signal spk(t) convolved by a linear response g(t) (assuming the room can be approximately modeled as a finite duration linear plant) as per the following equation:

$$\text{echo}(t) = spk(t) * g(t) = \int_0^{T_e} g(\tau)\cdot spk(t-\tau)\,d\tau$$

where * means convolution, $T_e$ is the echo length or filter length of the room response.

In order to remove the echo for the remote user, AEC 210 is added in the system as shown in FIG. 2. When a frame of samples in the mic[n] signal is retrieved from the capture buffer 130, they are sent to the AEC 210. At the same time, when a frame of samples in the spk[n] signal is sent to the render buffer 140, they are also sent to the AEC 210. The AEC 210 uses the spk[n] signal from the far end to predict the echo in the captured mic[n] signal. Then, the AEC 210 subtracts the predicted echo from the mic[n] signal. This difference or residual is the clear voice signal (voice[n]), which is theoretically echo free and very close to the near end user's voice (voice(t)).

FIG. 3 depicts an implementation of the AEC 210 based on an adaptive filter 310. The AEC 210 takes two inputs, the mic[n] and spk[n] signals. It uses the spk[n] signal to predict the echo in the mic[n] signal. The prediction residual (difference of the mic[n] signal from the prediction based on spk[n]) is the voice[n] signal, which will be output as echo free voice and sent to the far end.

The actual room response (that is represented as g(t) in the above convolution equation) usually varies with time, such as due to change in position of the microphone 110 or speaker 160, body movement of the near end user, and even room temperature. The room response therefore cannot be predetermined, and must be calculated adaptively at running time. The AEC 210 commonly is based on adaptive filters such as Least Mean Square (LMS) adaptive filters 310, which can adaptively model the varying room response.

The nature of adaptive filtering requires that the microphone signal and the reference or speaker signal must be accurately aligned. In basic terms, the AEC mode has to determine which samples in the speaker signal (spk[n]) are needed to predict the echo at a given sample in the microphone signal (mic[n]). In practical terms, the AEC operates on two streams (the microphone and speaker samples), which generally are sampled by two different sampling clocks and may each be subject to delays. Accordingly, the same indices in the two stream may not be necessarily aligned in physical time. On personal computers, timestamps are typically used to align the microphone and speaker signals, since the timestamp represents the physical time of when a sample is rendered (in the speaker stream) or captured (in the microphone stream). Frames of speaker spk[n] and microphone mic[n] signals are stored in separate data queues and the timestamps are used to make adjustments to the speaker (or microphone) data queues in order to align the speaker and microphone signals. A difference in render and capture sampling (clock) rates is called drift, and to compensate for this, periodic single sample adjustments commensurate with the drift rate are made to the speaker data queue. Also when a glitch occurs (i.e., data loss of one or multiple samples in the speaker or microphone streams) an adjustment of many samples of data may be made at once in the speaker data queue.

However, in practice, these timestamps are noisy and sometimes can be very wrong. One reason for this is that major operating systems, such as Microsoft Windows XP operating system, support numerous different audio devices. It is quite common that some audio device and its driver cannot provide accurate timestamps. In such case, the signals are often out of alignment, and the AEC fails to properly cancel echoes.

2. Voice Switching

Voice switching is a method used for half-duplex two-way communication. A typical example of such communication system has two signal channels: an incoming channel that receives the voice signal coming from the far-end, and an outgoing channel that sends the near end voice signal to the far-end. In a person-to-person scenario, the far-end may be another end user device. Alternatively, in a conference or multi-user scenario, the far end may be a server that hosts the multiple user conference. Based on voice activity being present at the two ends, the channels are selectively turned on or off. In other words, whenever there is voice activity in one channel, the other channel is turned off. By selectively switching off either incoming or outgoing channels based on voice activity in this way, the echo path is broken, which effectively removes acoustic echoes. The drawback of voice switching, however, is that it provides only half-duplex mode of communication, resulting in loss of easy interruptability in conversations.

Voice switching is commonly used on low-end desktop phones in speaker phone mode. A basic voice switching algorithm simply compares the strength of near-end and far-end voices and turns on the communication channel for the end with the stronger voice. It is relatively simple to compare voice activity on a standalone or dedicated phone device, because the microphone and speaker gains are known. During double talk scenarios (i.e., in which both ends are talking simultaneously), it is easy to estimate echo strength and thus easy to compare which voice is stronger. However, for voice communication applications on personal computers, any microphone or speaker may be connected to the computer, and the gains could be adjusted by the users at any time. This complicates the ability to estimate the echo strength, and therefore to compare the voice strength on the channels to accurately determine which channel should be switched on.

SUMMARY

The following Detailed Description concerns techniques (implemented via methods, devices and systems) to reduce acoustic echo in a two way voice communications system. According to the described techniques, the system utilizes acoustic echo cancellation for full duplex voice communications between two communication end devices under normal operating conditions. Additionally, the system includes a voice switching mode as a fall back for situations where acoustic echo cancellation fails or would likely fail to function properly. The technique concerns ways to appropriately decide between use of the normal operation mode utilizing acoustic echo cancellation, and use of the voice switching mode.

One way for making the decision between these modes of operation is to enable the voice switching mode based independently on timestamp based factors that can lead to speaker (or microphone data) queue adjustments during acoustic echo cancellation operation.

According to the technique described herein, the decision between modes relies on an overall measurement of timestamp quality. More particularly, the combined effect of all the timestamp parameter variations on the acoustic echo cancellation process occurs through adjustments to the input data queue (e.g., adjusting the relative offset between speaker and microphone queues or buffers). Hence, the overall impact of timestamp quality on the acoustic echo cancellation can be investigated by examining the rate at which adjustments are being made to the queue. In general summary, the technique therefore chooses or remains in the acoustic echo cancellation mode (i.e., does not enable voice switching) if adjustments to the queue are being made in a consistent/periodic manner, and the frequency of adjustments is within tolerance for drift of the acoustic echo cancellation process.

In one example implementation, the median and median absolute deviation of the rate at which adjustments are made to the queue is used as a measure of queue update consistency. This implementation of the mode decision technique then decides to enable voice switching if the median drift rate or median absolute deviation of the estimated drift rate (both based on queue adjustments) or the rate at which glitches occur exceed pre-determined thresholds. These checks are applied only after a minimum number of adjustments have been made, so as to ensure that the derived statistics are reliable.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following detailed description concerns various techniques and systems for providing acoustic echo cancellation with voice switching as a fall back mode in two-way communication systems. The described techniques provide a mode decision that reliably and accurately assesses whether acoustic echo cancellation is feasible based on timestamp quality, by measuring the consistency of the frequency at which adjustments are made to input data queues due to timestamp drift rate. The mode decision techniques are described with particular application in personal computer based telephony and voice chat applications, where the voice switching technique may be employed as a fall back measure in the case that acoustic echo cancellation fails to work properly (such as, due to inaccurate or "noisy" timestamps preventing alignment of microphone and speaker signals). However, the techniques to decide whether to fall back to voice switching can be applied more broadly to other two-way voice communication systems and scenarios.

The various techniques and tools described herein may be used independently. Some of the techniques and tools may be used in combination. Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

Figure 4:
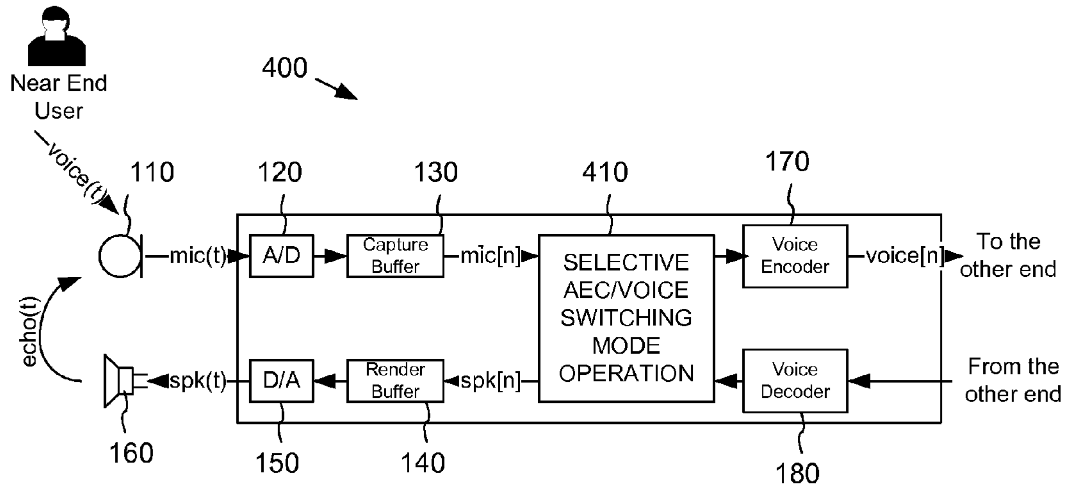
FIG. 4 is a flow diagram illustrating an end device of a two-way voice communication system including selection of acoustic echo cancellation or voice switching mode operation based on timestamp quality.

I. Overview of Two-Way Communication System with Improved AEC/Voice Switch Mode Selection FIG. 4 illustrates one end of a two-way communication system that includes the improved AEC or Voice Switching Mode selection, as described more fully below. The other end is typically, but not necessarily identical. Each end may be a communication device, such as a phone device or a personal computer with a telephony or voice chat application, or a game console, among other examples. In some implementations, the far end can be a communication server, such as a voice conferencing host server.

The illustrated near end 100 includes a capture stream path and a render stream path for the audio data in the two directions. In the capture stream path in the figure, an analog to digital (A/D) converter 120 converts the analog sound captured by microphone 110 to digital audio samples continuously at a sampling rate ($fs_{mic}$). The digital audio samples are saved in capture buffer 130 sample by sample. The samples are retrieved from the capture buffer in frame increments (herein denoted as "mic[n]"). Frame here means a number (N) of digital audio samples. Finally, samples in mic[n] are processed, including encoding via a voice encoder 170 and sent to the other end.

In the render stream path, the system receives the encoded voice signal from the other end, decodes audio samples via voice decoder 180 and places the audio samples into a render buffer 140 in periodic frame increments (labeled "spk[n]" in the figure). Then the digital to analog (D/A) converter 150 reads audio samples from the render buffer sample by sample and converts them to an analog signal continuously at a sampling rate, $fs_{spk}$. Finally, the analog signal is played by speaker 160.

The capture and render buffers (with associated histories) 130, 140 are also referred to herein as microphone and speaker data queues, respectively.

The illustrated communication system end device includes selective AEC or voice switching mode operation 410 to avoid or reduce acoustic echo (echo(t)) of the far end speaker's voice picked up by the microphone 110 to be sent back to the far end.

II. AEC or Voice Switch Mode Decision

Figure 1:
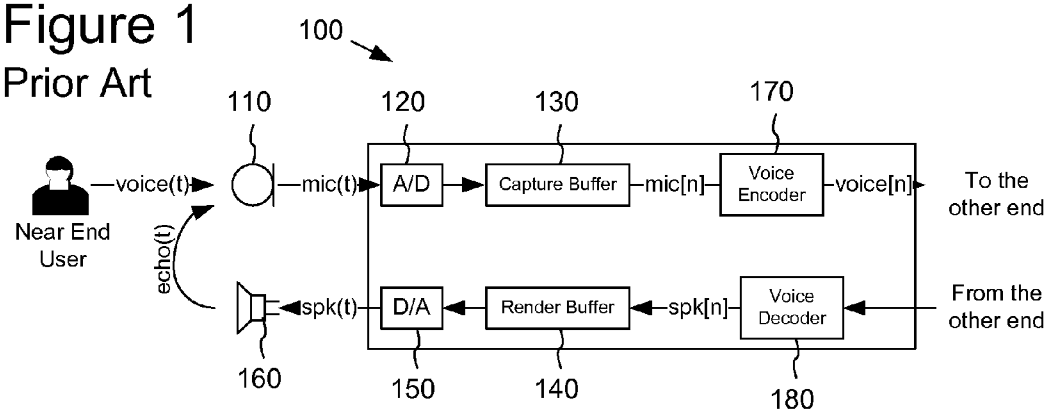
FIG. 1 is a block diagram illustrating one end of a typical two-way communication system in the prior art.
Figure 2:
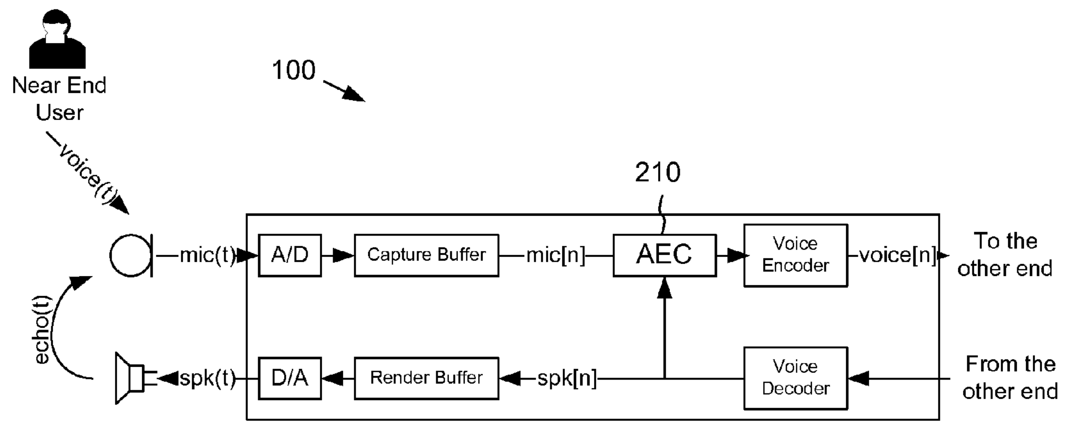
FIG. 2 is a block diagram of the two-way communication system of FIG. 1 with audio echo cancellation.
Figure 3:
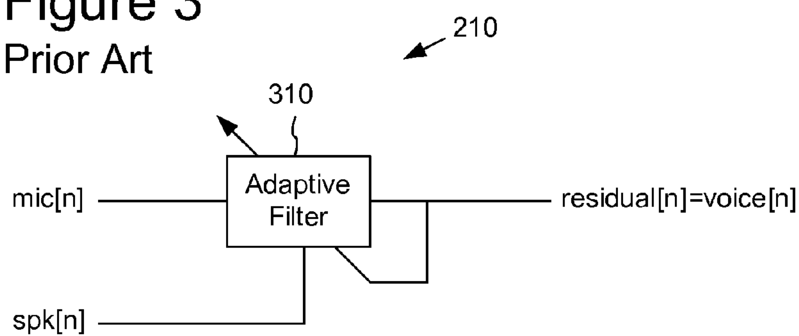
FIG. 3 is a block diagram of an implementation of audio echo cancellation based on an adaptive filter.

In general use, the selective AEC/voice switching mode operation 410 of the two-way communication system provides full duplex two-way communication using acoustic echo cancellation 210, which is implemented as illustrated in FIG. 2 and discussed above. The selective mode operation instead enables voice switching mode as a fall back mechanism under operating conditions where the acoustic echo cancellation 210 would fail to work properly to cancel echo or would introduce unacceptable noise or distortion effects. Accordingly, the two-way communication end 400 analyzes the AEC mode operation via one or more quality checks to determine if the communication quality is sufficient for acoustic echo cancellation to work properly, so as to determine which operation mode to use.

For the AEC to maintain the speaker and microphone streams in synchrony for proper AEC behavior, information from the timestamps is used to make adjustments to the speaker data queue (or in alternative implementations, the adjustments can be made to the microphone queue). Depending on the physical conditions, adjustments to the speaker data queue may be required due to:

(1) Glitches: A glitch occurs due to data loss of one or multiple samples in the speaker or microphone streams. When a glitch occurs, an adjustment of many samples of data may be made at once in the speaker queue.

(2) Drift: A difference in render and capture sampling (clock) rates is called drift, and results in periodic single sample adjustments commensurate with the drift rate.

(3) Timestamp Noise: Additionally, the timestamp data is not always reliable or noise free. This can lead to irrelevant queue adjustments that can severely impact AEC performance.

In more detail, a timestamp marks the time when the first sample of a data frame is captured or rendered, such as at the A/D converter 120 (FIG. 4) and D/A converter 150, respectively. Ideally, the timestamp should match the device's stated sampling rate perfectly. For example, assuming the two-way communication end device 400 has a sampling rate of 16000 Hz and a 10 millisecond data frame is used by the device for capturing and rendering audio signals, then an audio data frame has 160 samples. This means that for each captured or rendered frame containing 160 samples, the timestamp of the first sample of consecutive frames should increase by exactly 10 milliseconds. In other words, the frame length calculated from the timestamps of consecutive frames should be exactly 10 milliseconds.

In practice, there may be errors in the timestamps, as discussed more fully in the background. This can result in the frame length calculated from timestamps being more or less than expected length (e.g., 10 milliseconds in this example implementation). If the long term average of the calculated frame length varies from the expected frame length, then the difference is called the timestamp drift. The drift divided by the nominal frame length is called the timestamp drift rate. A non-zero timestamp drift rate signifies the communication end device's sampling rate is off from its claimed or nominal rate. Finally, for each audio data frame, the difference of the respective frame's length from the long term average frame length is termed the "timestamp noise."

Further, as already remarked, queue adjustments also may result from audio glitches. Audio glitches mean discontinuities in the audio stream. For audio data capture (e.g., the microphone 110 and A/D converter 120), audio glitches may occur when the application is not able to retrieve samples in the capture buffer in time so that the capture buffer becomes over full, which can result in lost audio capture samples. For the audio data rendering (e.g., from loudspeaker 160 and D/A converter), audio glitches can mean the application does not fill the render buffer quickly enough, so the audio rendering device has no data to play.

Even when the timestamp data matches the physical situation accurately and adjustments to the queue are necessary to maintain correct AEC operation, the discontinuity caused by an adjustment has a negative impact on AEC performance. Beyond a point at which the periodic or transient adjustments are made at too high of a rate, the adaptive filters used for AEC stop working entirely. In such situations, the two-way communication system should instead enable voice switching mode, which is far less sensitive to timing mismatches.

Figure 5:
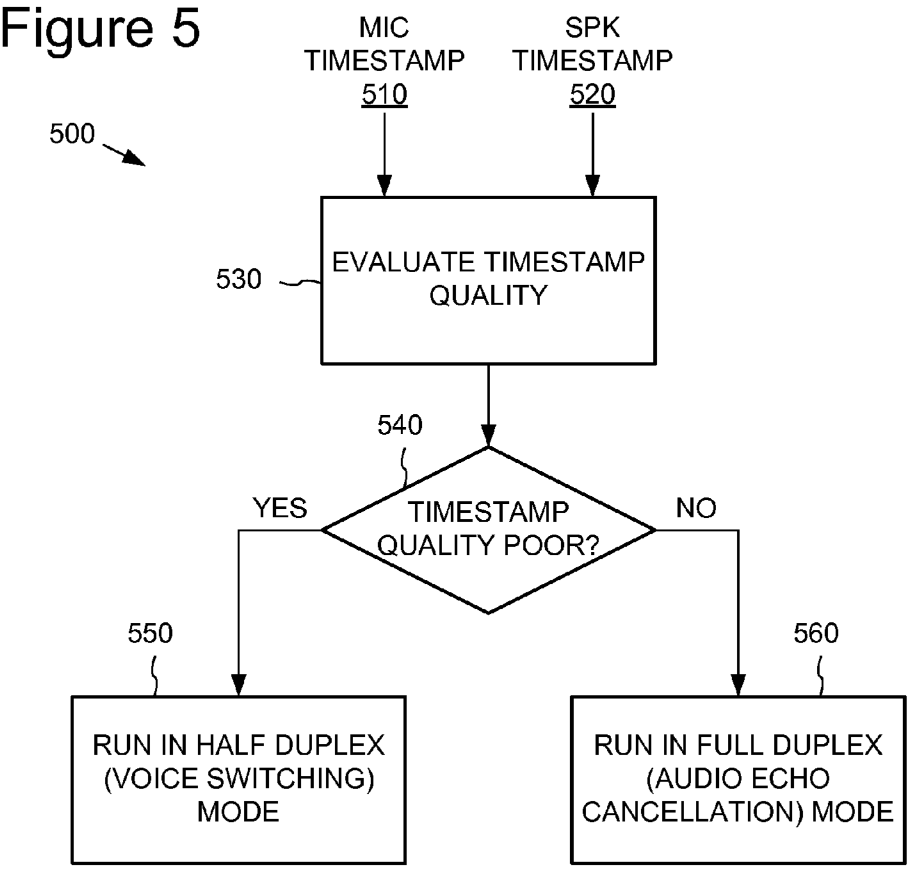
FIG. 5 is a flow diagram illustrating a decision to operate in acoustic echo cancellation mode or to enable voice switching mode based on timestamp quality in the two-way voice communication end device of FIG. 4.

FIG. 5 illustrates a top level decision 500 made by the two-way communication system 400 to select between AEC or voice switching mode operation 410 so as to provide an echo free experience. For this decision 540, the two-way communication system evaluates 510 the quality of the microphone and speaker stream timestamps 520, 530. If the timestamp quality is found to be poor, the two-way communication system falls back to operate in the voice-switching (half duplex) mode 550. Else, the two-way communication system continues to operate in full duplex with AEC mode 560.

III. Timestamp Quality Evaluation

Figure 6:
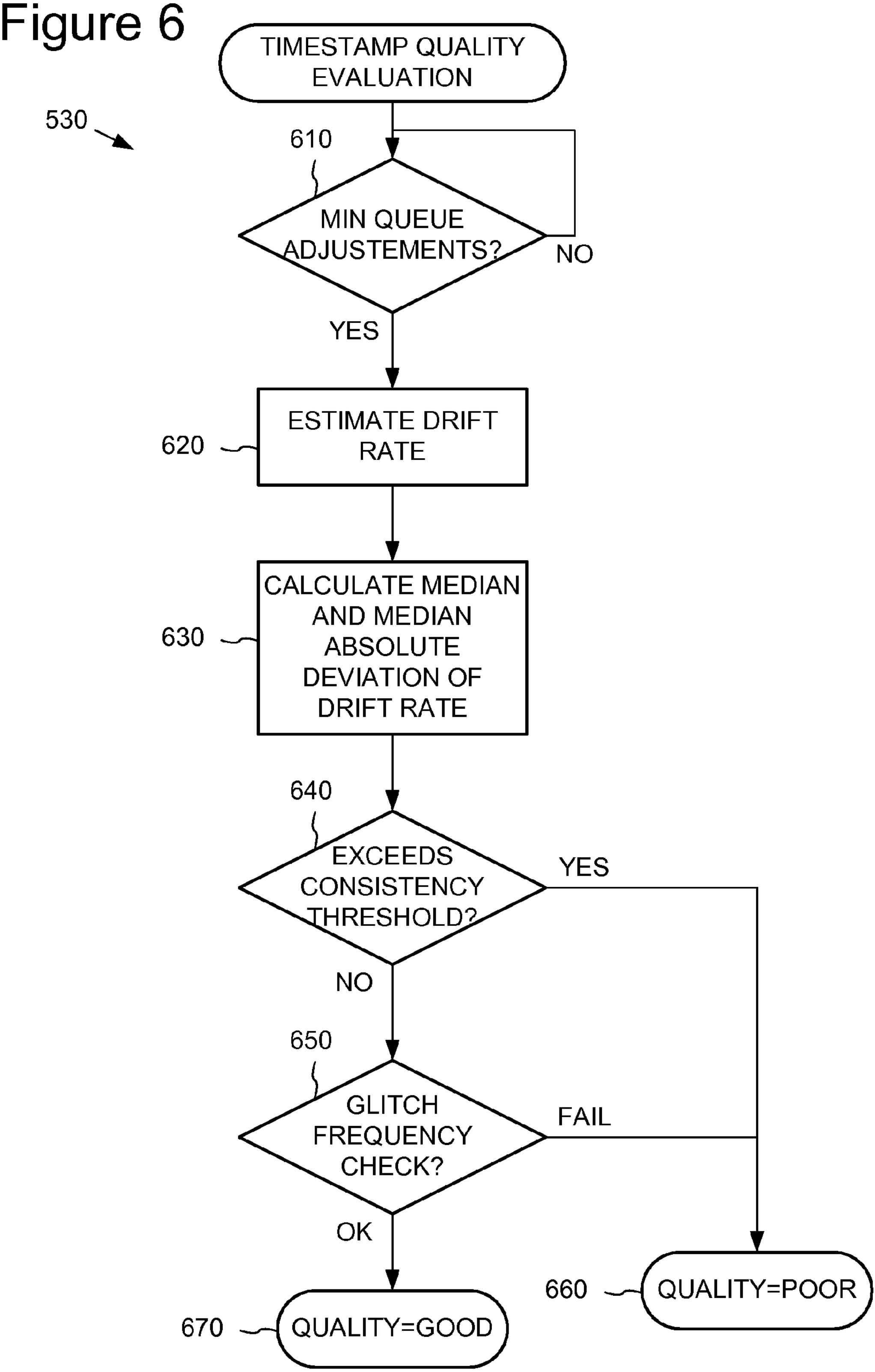
FIG. 6 is a flow diagram illustrating a process to evaluate timestamp quality for the acoustic echo cancellation or voice switching mode decision of FIG. 5 using measurements of consistency of the rate at which queue adjustments are made.

With reference now to FIG. 6, the evaluation 530 of the timestamp quality for the AEC or voice switching mode decision 500 (FIG. 5) is based on the rate of adjustments made to the queue during AEC operation. The evaluation considers the overall impact of timestamp quality on the acoustic echo cancellation by examining the rate at which adjustments are being made to the queue. In summary, the evaluation assesses whether adjustments to the queue are being made in a consistent/periodic manner, and the frequency of adjustments is within tolerance for drift of the acoustic echo cancellation process.

For the evaluation 530, the two-way communication end device 400 calculates an estimate of the drift rate based on queue adjustments (action 620). As discussed above, the timestamp drift generally results in periodic single sample adjustments of the queue. The frequency at which these queue adjustments are made therefore relates to the timestamp drift rate, and can be used as an estimate of the drift rate.

The timestamp quality evaluation then calculates consistency statistics of the periodic queue adjustments made by the AEC process to compensate for timestamp drift. In one example timestamp quality evaluation implementation, the statistical median and median absolute deviation of the estimated drift rate (action 630) are used as measures of how periodic and consistent the adjustments are made by the acoustic echo cancellation process to the queue. Because under normal operating conditions, the number of adjustments made in a second is quite low, the median and median absolute deviation of the queue adjustment rate provide a robust estimate of consistency. However, alternative timestamp quality implementation can use other statistical calculations of the consistency of drift rate queue adjustments.

In order to ensure that the derived statistics are reliable, the evaluation 530 first requires that a minimum number of adjustments to the queue occur (action 610) before the timestamp quality evaluation performs any timestamp quality checks. In one implementation of the evaluation 530, the evaluation first requires monitoring for a minimum number of queue adjustments over a 10 second window of time before checks on the calculated statistics are performed.

After at least this minimum time window (action 610) has passed, the two-way communication end device compares the median and median absolute deviation statistics to threshold values (action 640), which reflect the acoustic echo cancellation's tolerance for timestamp drift. For one example AEC implementation, thresholds of 0.1% for the median drift rate and 0.05 per 1000 for the median absolute deviation are used. However, other AEC implementations may have a lower or higher tolerance for timestamp drift. Accordingly, alternative implementations of the timestamp quality evaluation 530 may apply other threshold values of median estimated drift rate and median absolute deviation of the drift rate. If the calculated median and/or median absolute deviation of the estimated drift rate exceed the threshold values, then the queue adjustments are considered too frequent and/or inconsistent such as to exceed the AEC's tolerance for queue adjustments.

In addition to the periodic consistency check (action 640), the two-way communication end device also applies a glitch frequency check (action 650). As discussed previously, audio glitches occur when there is a loss of multiple samples of the microphone and/or speaker queues. This requires a large (multiple samples) adjustment of the queue. For the glitch check (action 650), the two-way communication end device checks whether a glitch of greater than 4 milliseconds has occurred more frequently than once per second. If this glitch frequency is exceeded, then the glitch frequency check is failed.

In the case that either the queue adjustments made by the AEC process exceed the consistency statistics thresholds or the glitch frequency check, then the timestamp quality evaluation determines that the timestamp quality is poor (action 660). If both the queue adjustments pass both the drift rate consistency (640) and glitch frequency checks (650), then the timestamp quality is considered adequate.

The two-way communication end device can perform the timestamp quality check at periodic intervals, or simply one or more times at the start of the communication system. In one example implementation, each end of the two-way communication system performs the quality check at preset intervals after the communication session (e.g., voice call or conference) is initiated. The initial quality check is done at about 4 seconds after the communication session starts, and is then repeated at 10 second intervals. If all quality checks produce the result that a sufficiently high quality for acoustic echo cancellation exists, then the two-way communication system end device may stop quality checks after 100 seconds. Initially, the two-way communication system end device operates in full duplex mode using acoustic echo cancellation, and continues with that operation so long as the quality checks have the sufficiently high quality result. However, if a quality check fails, then the two-way communication system end switches over to voice switching mode of operation. In alternative implementations, the two-way communication system may begin in half-duplex mode, continue quality checks throughout the communication session and switch to full duplex communication with acoustic echo cancellation when sufficiently high quality is detected, and otherwise remain in the voice switching mode. The quality checking is performed independently for each end device, which may result in one end device having sufficiently high quality to operate in full duplex with acoustic echo cancellation while the other device has insufficient quality and falls back to the voice switching mode.

IV. Computing Environment

The two-way communication end device 400 shown in FIG. 4 can be implemented as dedicated or special purpose communication device (e.g., a desktop phone, in which the selective AEC/voice switching mode operation 410 is implemented using a digital signal processor programmed by firmware or software to operate as illustrated in FIGS. 5 and 6.

Figure 7:
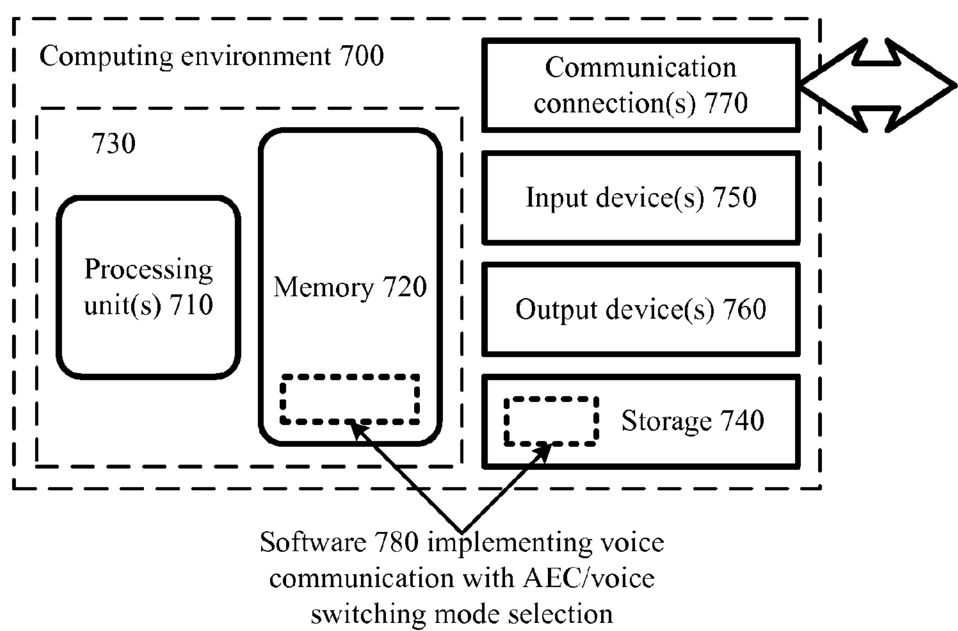
FIG. 7 is a block diagram of a generalized operating environment in conjunction with which various described embodiments may be implemented.

Alternatively, the two-way communication system can be implemented using a general purpose computer with suitable programming to perform the selective AEC/voice switching mode operation using a digital signal processor on a sound card, or even the central processing unit of the computer to perform the digital audio signal processing. For example, the two-way communication system can be a laptop or desktop computer with voice communication software (e.g., a telephony, voice conferencing or voice chat application software). Alternatively, the two-way communication system can be a mobile computing device that provides voice communication. FIG. 7 illustrates a generalized example of a suitable computing environment 700 in which the two-way communication system 400 with selective AEC/voice switching mode operation 410 may be implemented on such general purpose computers. The computing environment 700 is not intended to suggest any limitation as to scope of use or functionality, as described embodiments may be implemented in diverse general-purpose or special-purpose computing environments, as well as dedicated audio processing equipment.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The processing unit also can comprise a central processing unit and co-processors, and/or dedicated or special purpose processing units (e.g., an audio processor or digital signal processor, such as on a sound card). The memory 720 may be volatile memory (e.g., registers, cache, RAM), non-volatile memory (e.g., ROM, EEPROM, flash memory), or some combination of the two. The memory 720 stores software 780 implementing one or more audio processing techniques and/or systems according to one or more of the described embodiments.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for software executing in the computing environment 700 and coordinates activities of the components of the computing environment 700.

The storage 740 may be removable or non-removable, and includes magnetic disks, magnetic tapes or cassettes, CDs, DVDs, or any other medium which can be used to store information and which can be accessed within the computing environment 700. The storage 740 stores instructions for the software 780.

The input device(s) 750 may be a touch input device such as a keyboard, mouse, pen, touchscreen or trackball, a voice input device, a scanning device, or another device that provides input to the computing environment 700. For audio or video, the input device(s) 750 may be a microphone, sound card, video card, TV tuner card, or similar device that accepts audio or video input in analog or digital form, or a CD or DVD that reads audio or video samples into the computing environment. The output device(s) 760 may be a display, printer, speaker, CD/DVD-writer, network adapter, or another device that provides output from the computing environment 700.

The communication connection(s) 770 enable communication over a communication medium to one or more other computing entities. The communication medium conveys information such as computer-executable instructions, audio or video information, or other data in a data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments can be described in the general context of computer-readable media. Computer-readable media are any available media that can be accessed within a computing environment. By way of example, and not limitation, with the computing environment 700, computer-readable media include memory 720, storage 740, and combinations of any of the above.

Embodiments can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing environment.

For the sake of presentation, the detailed description uses terms like “determine,” “receive,” and “perform” to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of preventing acoustic echo in a two-way voice communication end device via queue adjustments, the method comprising:

upon starting a communication session with another communication end device, making adjustments to an audio data queue corresponding to either a render stream or a capture stream of the two-way voice communication end device based at least in part on an offset of respective timestamps of the render stream and the capture stream;

assessing consistency of the adjustments made to the audio data queue;

determining whether a timestamp drift rate is within a tolerance threshold for effective acoustic echo cancellation from the consistency assessment;

in a case that the timestamp drift rate is within the tolerance threshold, operating in a full duplex voice communication with acoustic echo cancellation mode; and in a case that the timestamp drift rate exceeds the tolerance threshold, operating in a half duplex mode with voice switching.

2. The method of claim 1 wherein said assessing consistency of the queue adjustments comprises estimating the timestamp drift rate based on a frequency at which the queue adjustments are made.

3. The method of claim 1 wherein said assessing consistency of the queue adjustments comprises calculating a median absolute deviation of a drift rate relating to a rate of queue adjustments.

4. The method of claim 3 wherein said determining whether the timestamp drift rate is within the tolerance threshold comprises checking whether the calculated median absolute deviation of the drift rate exceeds the tolerance threshold.

5. The method of claim 1 wherein said assessing consistency of the queue adjustments comprises calculating a median of a drift rate relating to a rate of queue adjustments.

6. The method of claim 5 wherein said determining whether the timestamp drift rate is within the tolerance threshold comprises checking whether the calculated median of the drift rate exceeds the tolerance threshold.

7. The method of claim 1 further comprising:

performing a glitch frequency check; and in a case that the glitch frequency check fails, operating in the half duplex mode with voice switching.

8. One or more computer-readable media, not consisting of a signal, having computer executable instructions, which, when executed by a computer, cause the computer to perform the method of claim 1.

9. The method of claim 1 wherein said assessing consistency of the queue adjustments comprises assessing periodicity of a frequency at which the queue adjustments are made.

10. The method of claim 1 wherein the timestamp drift rate is indicative of a difference between a calculated frame length and an expected frame length of the audio data queue.

11. A two-way voice communication end device comprising:

an audio render device for playing an incoming voice signal received from another end device to a user, and providing timestamps for a render audio stream of the incoming voice signal;

an outgoing voice channel for capturing an outgoing voice signal from the user for sending to said other end device, and providing timestamps for a capture audio stream of the outgoing voice signal;

an audio processor for processing the capture and render audio streams according to a selective one of at least two operating modes comprising a full duplex mode using acoustic echo cancellation and a half duplex mode using voice switching to reduce acoustic echo via queue adjustments, wherein the audio processor makes adjustments to an audio data queue corresponding to at least one of the render audio stream and the capture audio stream due to a relative offset between the timestamps for the capture audio stream and the timestamps for the render audio stream during operation in the full duplex mode;

the audio processor performing a timestamp quality evaluation to select the operating mode, wherein the timestamp quality evaluation comprises the acts of:

assessing consistency of the adjustments made to the audio data queue;

determining whether a timestamp drift rate is within a tolerance threshold for effective acoustic echo cancellation from the consistency assessment;

in a case that the timestamp drift rate is within the tolerance threshold, operating in a full duplex voice communication with acoustic echo cancellation mode; and in a case that the timestamp drift rate exceeds the tolerance threshold, operating in the half duplex mode.

12. The two-way voice communication end device of claim 11 wherein said assessing consistency of the queue adjustments comprises estimating the timestamp drift rate based on a frequency at which the queue adjustments are made.

13. The two-way voice communication end device of claim 11 wherein said assessing consistency of the queue adjustments comprises calculating a median absolute deviation of a drift rate relating to a rate of queue adjustments.

14. The two-way voice communication end device of claim 13 wherein said determining whether the timestamp drift rate is within the tolerance threshold comprises checking whether the calculated median absolute deviation of the drift rate exceeds the tolerance threshold.

15. The two-way voice communication end device of claim 11 wherein said assessing consistency of the queue adjustments comprises calculating a median of a drift rate relating to a rate of queue adjustments.

16. The two-way voice communication end device of claim 15 wherein said determining whether the timestamp drift rate is within the tolerance threshold comprises checking whether the calculated median of the drift rate exceeds the tolerance threshold.

17. The two-way voice communication end device of claim 11 the audio processor further performs a glitch frequency check, and if the glitch frequency check fails, operating in the half duplex mode.

18. The two-way voice communication end device of claim 11 wherein the timestamp drift rate is indicative of a difference between a calculated frame length and an expected frame length of the audio data queue.

19. A method comprising:

receiving an audio data queue with timestamps that has been adjusted due to relative offset of render and capture streams;

based at least in part on a rate at which the adjustments were made to the audio data queue, performing a timestamp quality evaluation on the received audio data queue, wherein the performing of the timestamp quality evaluation comprises determining based at least in part on a tolerance threshold whether timestamp quality is poor or good;

if the timestamp quality is determined to be poor, indicating that a two-way communication system operate in half duplex mode with voice switching; and if the timestamp quality is determined to be good, indicating that the two-way communication system operate in a full duplex mode with acoustic echo cancellation.

20. The method of claim 19 wherein the performing of the timestamp evaluation comprises determining a drift rate using the rate at which the adjustments were made to the audio data queue, and the determining of whether the timestamp quality is poor or good is based at least in part on the drift rate.

* * * * *